Aug. 9, 1949.   E. P. ROSS   2,478,839
INSTRUMENT FOR CONTROLLING THE FIRING OF ORDNANCE
Filed March 31, 1932   3 Sheets-Sheet 1
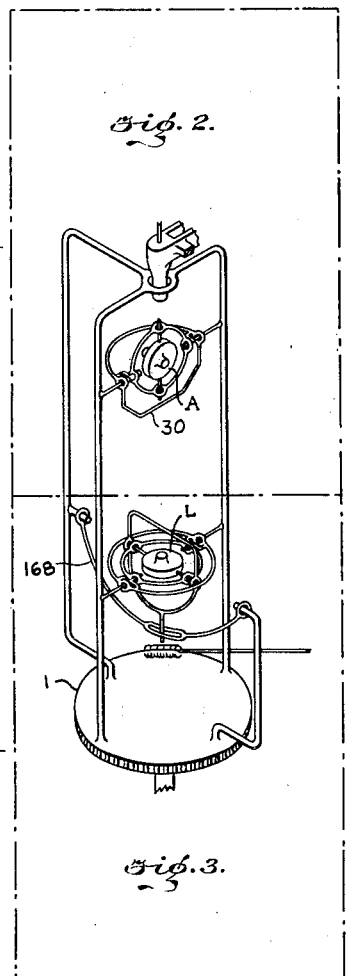
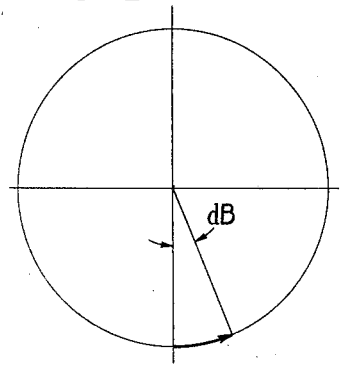
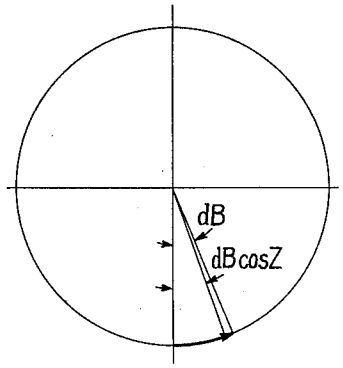
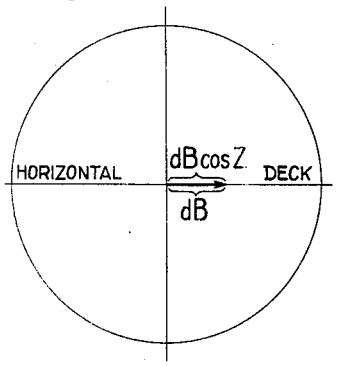
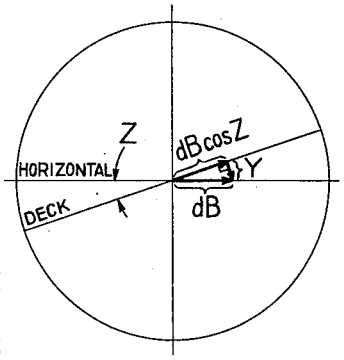
INVENTOR
Elliott P. Ross
BY
Mauchly and Gill
ATTORNEYS

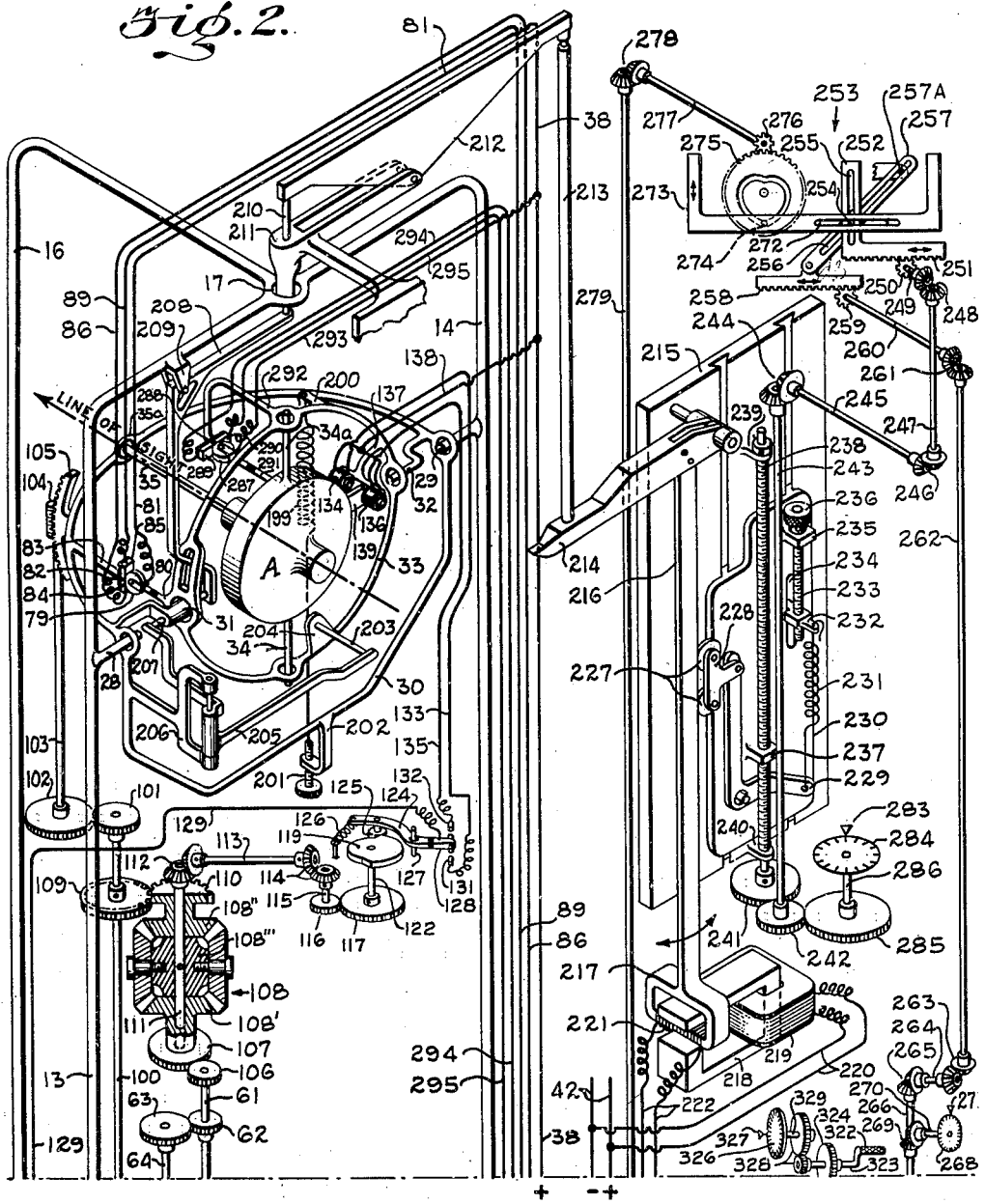

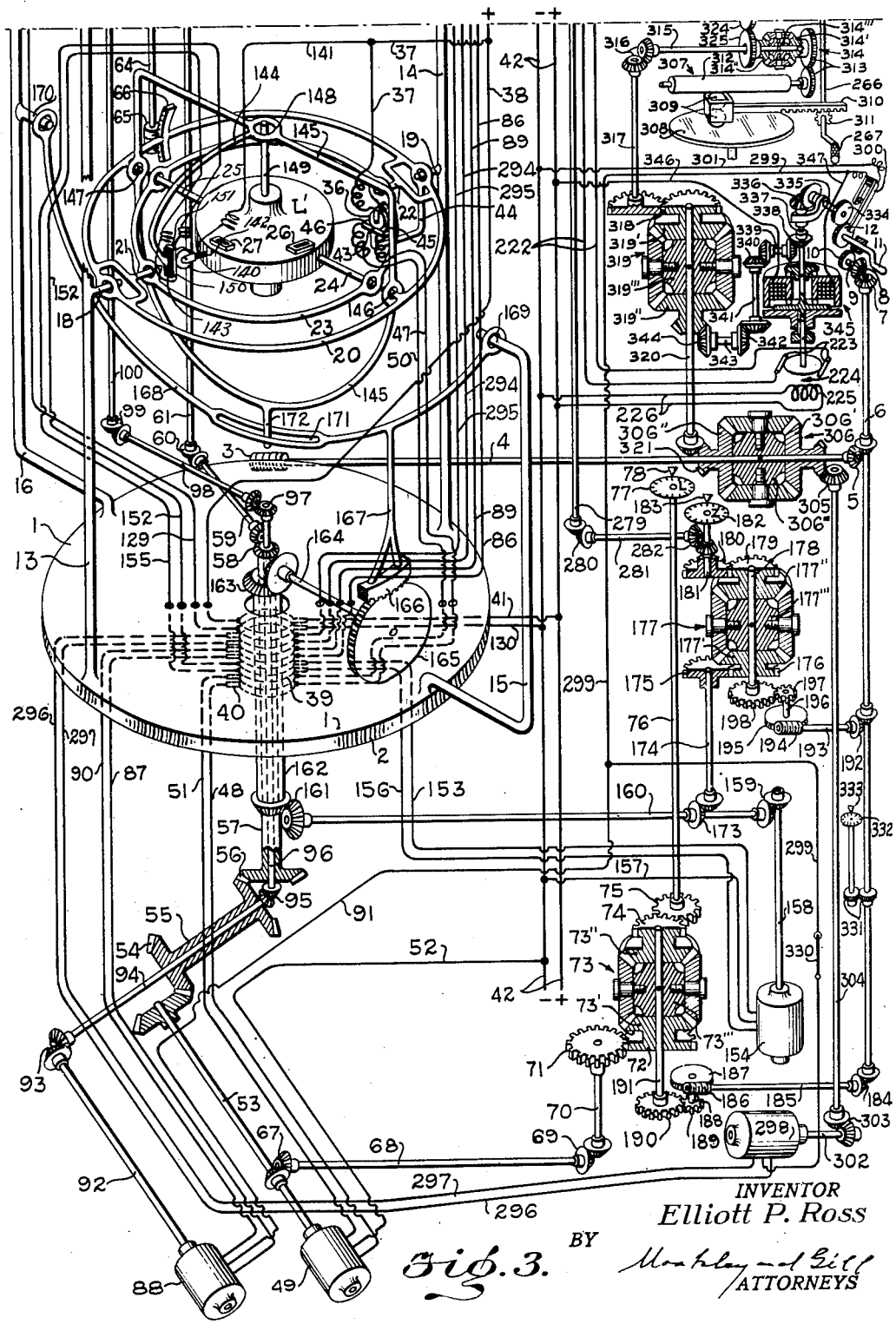

Patented Aug. 9, 1949

2,478,839

UNITED STATES PATENT OFFICE 2,478,839

INSTRUMENT FOR CONTROLLING THE FIRING OF ORDNANCE

Elliott P. Ross, Forest Hills, N. Y., assignor to The Sperry Corporation, a corporation of Delaware Application March 31, 1932, Serial No. 602,374

24 Claims. (Cl. 33—49)

This invention relates to instruments for controlling the firing of ordnance mounted on ships or other moving platforms, and more particularly to mechanism adapted to serve as a directing and reference element for use with other mechanisms for predicting future positions of the target in order that the guns may be properly aimed for their projectiles to hit the target.

According to the present invention, a pair of gimbal systems containing two gyroscopes are supported on the main frame of the mechanism so as to be trainable as a unit. One of the gyroscopes, the level gyroscope, as it will hereinafter be called, serves to establish a stable reference plane relative to which the ship's angular movements are measured. Preferably the axis of the rotating mass of this gyroscope is vertically disposed so that the plane of reference established by this gyroscope is a horizontal one. The angular movement of the ship relative to the reference plane may be divided into two components, level and cross-level. Level, hereinafter designated L, is the inclination, relative to the reference plane, of the deck of the ship in a plane normal to the deck through the line of sight. Cross-level, hereinafter designated Z, is the angle between the reference plane and the deck measured in the plane perpendicular to the deck which is also at right angles to the plane of level.

The other gyroscope designated the angle gyroscope, has the axis of its rotating mass normally disposed parallel to the line of sight to the target and in the case of a surface target this axis is substantially horizontal. This gyroscope serves as a controlling means for training the main frame to properly orient the axes of the level gyroscope with respect to the line of sight.

It will be understood that for certain adaptations it may be desirable to measure other, but corresponding, angles by either or both gyroscopes without departing from the spirit of the invention.

To accomplish its control function, precessional forces are applied to the angle gyroscope to cause it to precess at such a rate and direction that its spinning axis will remain parallel to the line of sight as the bearing of the line of sight changes. It is an object of this invention to provide mechanism for so controlling the precessional forces applied to the angle gyroscope that the resultant precession, regardless of the angular movement of the platform, will be in the desired direction and amount to maintain the axis of the angle gyroscope parallel to the line of sight. The precessional force is applied to the angle gyroscope by a mechanism which includes means for changing a rate of change in bearing measured in a horizontal plane into a similar rate of change measured in the plane of the deck and means for converting the latter rate into a force proportional thereto. In other words, to compensate for the effect of cross-level on the angle gyro, the mechanism includes means for modifying the force applied in proportion to a function of the cross-level.

It is a further object of the invention to provide a second mechanism or directing element and means for selectively using either mechanism.

The particular nature of the invention as well as other objects and advantages thereof, will appear more clearly from a description of a preferred embodiment as shown in the accompanying drawings, in which:

Fig. 1 is a key figure showing the manner in which Figs. 2 and 3 are coordinated, and Figs. 2 and 3, when arranged in accordance with Fig. 1, are a diagrammatic perspective view of the entire mechanism.

Figs. 4, 5, 6 and 7 are diagrams referred to in the description of the mechanism.

The gyroscopes L' and A, L' being the level and A the angle gyroscope, together with the other elements of the mechanism which are preferably trained therewith, are carried by a turntable I. Turntable I may be mounted for rotation on a pedestal (not shown) or on the frame of the instrument in which the mechanism of this invention may be incorporated. The periphery of turntable I is toothed as at 2 to mesh with a worm 3 fixed to a shaft 4 which is connected through bevel gears 5 to a shaft 6. A bevel gear 7 is fixed to the upper end of shaft 6 and meshes with a bevel gear 8 secured to a shaft 9 which also has secured thereto a gear 10. A trainer's hand crank 11 is mounted for axial movement in the frame of the instrument and when in the out position causes a gear 12 secured thereto, to mesh with gear 10. When gears 12 and 10 are engaged, rotation of the hand crank 11 will cause the turntable I to train about its center.

Vertical standards 13, 14, 15 and 16 constitute the main frame of the instrument. Standards 13 and 14 are located at opposite ends of a diameter of turntable I, standards 15 and 16 are located at opposite ends of another diameter at 90° to the first diameter. Standards 13, 14 and 16 are bent at their upper ends and brought together to form a T. The junction of these standards is bored out to form a hole 17 which acts as a bearing as hereinafter explained.

Standards 13 and 14 are provided with trunnions 18 and 19, respectively, at equal heights from turntable 1'. On these trunnions is supported, through suitable bearings, the gimbal ring 20 which is provided with trunnions 21 and 22 aligned with trunnions 18 and 19. A gimbal ring 23 is supported through suitable bearings on trunnions 21 and 22 and is provided with a second set of bearings into which fit the trunnions 24 and 25 of the casing of gyroscope L'. Spirit levels 26 and 27 are provided on the casing of gyroscope L' to enable the operator to check the horizontality of the gyroscope L' so that he may precess it to correct for any straying from its normal position unless the gyroscope is of a type which is automatically corrected. Level 26 is mounted so as to be at right angles to the cross-level axis, i. e., the axis defined by trunnions 24 and 25 and level 27 is mounted so as to be at right angles to the level axis, i. e., the axis normally defined by trunnions 21 and 22.

Standards 13 and 14 are also provided with trunnions 28 and 29, respectively, at equal heights from turntable 1. Trunnions 28 and 29 support a gimbal member 30, also called the elevation frame, through suitable bearings provided therein. Gimbal member 30 carries trunnions 31 and 32 aligned with trunnions 28 and 29. Trunnion 31 is bored through its center for a purpose hereinafter described. Trunnions 31 and 32 fit into a pair of bearings in a gimbal ring 33 which has a second set of bearings into which fit trunnions 34 and 34a of the casing of the angle gyroscope A. Thus suspended, gyroscope A has the spinning axis of its rotating mass, which corresponds to the line of sight, normally disposed in a horizontal plane. A rod 35 projects from the casing of the gyroscope A in line with the axis just mentioned, and passes through the hole of a small ring 35a carried by gimbal member 30. Rod 35 and ring 35a act as a gyroscope wander limit or stop and serve to prevent the gyroscope A from moving beyond predetermined limits from its normal position.

When the ship upon which the mechanism is mounted rolls or pitches, the gyroscope L' in maintaining its normal horizontal position moves relative to the ship about the axis of trunnions 21 and 22, carrying gimbal ring 23 and roller 36 with it. The mount of roller 36 depends from the bearing into which fits trunnion 22, insulation being provided to electrically separate roller 36 from gimbal ring 23. Roller 36 is connected through conductors 37 and 38, the top one of slip rings 39 and its co-operating one of brushes 40, and conductor 41 to the plus side of supply line 42. The commutator 43 which co-acts with roller 36 and which is carried by bent rod 44 depending from the bearing into which fits trunnion 19, does not momentarily move relatively to the ship due to the roll thereof, but maintains its position relative thereto. Commutator 43 comprises two metallic contact elements 45 and 46 which are separated from each other by a narrow insulation strip which is an integral part of the insulation member which supports the elements 45 and 46 on rod 44. Contact element 45 is connected through conductor 47, the lower slip ring of the bottom pair of slip rings 39 and its co-operating one of brushes 40, and conductor 48 to one of the terminals of reversible motor 49. Contact element 46 is connected through conductor 50, the upper slip ring of the bottom pair of slip rings 39 and its co-operating one of brushes 40, and conductor 51 to another terminal of motor 49. The third or common terminal of motor 49 is connected to the minus side of line 42 through conductor 52.

With the first increment of motion of the platform, the relative movement between gimbal ring 23 which is connected to the gyroscope and gimbal ring 20 which is connected to the ship, will cause roller 36 to move off the central insulation portion of commutator 43 and onto one or the other of contact elements 45 or 46, depending on the direction of motion, to close an energizing circuit of motor 49. Motor 49 will then drive through shaft 53, bevel gears 54, hollow shaft 55, bevel gears 56, hollow shaft 57, bevel gears 58, shaft 59, bevel gears 60, shaft 61, gears 62 and 63, shaft 64, worm 65, and worm gear sector 66 to rotate gimbal ring 20 in the proper direction to cause commutator 43 to follow roller 36 and again offer its central insulation portion to contact of roller 36, thereby opening the circuit of motor 49. The action of motor 49 is sufficiently rapid to cause commutator 43 to substantially instantaneously follow each increment of movement of roller 36 so that it is never more than just off the central insulation portion of the commutator and the following movement of ring 20 though made up of a series of increments is in effect smooth and continuous.

The rotation of motor 49 is also communicated through bevel gears 67, shaft 68, bevel gears 69, shaft 70, gears 71 and 72, side 73' and side 73'' of differential 73, center 73''' being considered as held against movement at this time, gears 74 and 75, shaft 76 to dial 77 where the value of the angle of level, L, may be read opposite fixed index 78.

During the angular movement of the ship, gyroscope A, in maintaining its position, moves relative to the ship about the axis of trunnions 31 and 32, carrying with it gimbal ring 33 and roller 79 which is mounted on a rod 80 which extends from gimbal ring 33. Insulation is provided to electrically separate roller 79 from gimbal ring 33. A conductor 81 connects roller 79 to conductor 38 which, as previously described, leads to the plus side of supply line 42. The commutator 82 which co-acts with roller 79 and which is carried by a rod 83 forming part of the gimbal member 30, does not move momentarily relatively to the ship due to the movement thereof, but maintains its position. Commutator 82 comprises two metallic elements 84 and 85 which are separated from each other by a narrow insulation strip forming an integral part of the insulation member that supports them on rod 83. Contact element 84 is connected through conductor 86, the lower one of the middle pair of slip rings 39 and its co-operating one of brushes 40 and conductor 87, to one of the terminals of the reversible motor 88. Contact element 85 is connected through conductor 89 to the upper slip ring of the middle pair of slip rings 39 and its co-operating one of brushes 40 and conductor 90 to another of the terminals of motor 88. The third or common terminal of motor 88 is connected through conductor 91 to a conductor 299 which in turn connects through switch 300 to the minus side of supply line 42.

With the first increment of motion of the platform, the relative motion between gimbal ring 33 which moves with gyroscope A and gimbal ring 30 which moves with the ship, will cause roller 79 to move off the central insulation position of commutator 82 and on to one or the other of contact elements 84 or 85 depending upon the direction of the motion, to close an energizing circuit of motor 88. Motor 88 will then drive through shaft 92, bevel gears 93, shaft 94, bevel gears 95, shaft 96, bevel gears 97, shaft 98, bevel gears 99, shaft 100, gears 101 and 102, shaft 103, worm 104 and worm gear sector 105 to rotate gimbal member 30 in the proper direction to cause commutator 82 to follow roller 79 and again offer its central insulation portion to the contact of roller 79, thereby opening the contact of motor 88. The action of motor 88 is sufficiently rapid to cause each increment of movement of roller 79 to be substantially instantaneously followed by commutator 82, so that roller 79 is never more than just off the central insulation position of the commutator and the following movement of gimbal member 30, although made up of a series of increments, is in effect smooth and continuous.

Gyroscope A, because of its inevitable tendency to stray and for reasons hereinafter gone into, does not of itself always maintain the axis of its rotary mass horizontal but will at times move about the axis of trunnions 31 and 32 to carry the axis of its rotating mass, and, through the follow-up mechanism just described, gimbal member 30 with it. To intially level gyroscope A and to compensate for all of its movements about the axis of trunnions 31 and 32 other than those caused by the roll of the ship, shaft 61, which always rotates in accordance with the value of the angle of level due to the fact that gyroscope L' is always maintained level by the operator in charge of it or by automatic means, is connected through gears 106 and 107 to side 108' of the differential 108; and shaft 100, which always represents the actual position of gimbal member 30 and gyroscope A, is connected through gears 109 and 110 to the side 108'' of differential 108. When the angles represented by shafts 61 and 100 are equal, center 108''' of differential 108 will be stationary, but when they are unequal, center 108''' will rotate in accordance with their difference.

Shaft 111, having center 108''' of differential 108 secured to it, will then drive bevel gears 112, shaft 113, bevel gears 114, shaft 115 and spur gear 116 to rotate gear 117 which is fixed to shaft 122. Shaft 122 carries a cam 119 fixed to its upper end. A lever 124 carries roller 125 which is held against the cam 119 by the spring 126. Lever 124 is mounted on a pivot 127. Lever 124 also carries a movable contact element 128 electrically insulated from it. A conductor 129 connects contact 128, through the bottom one of the top pair of slip rings 39 and its co-operating one of brushes 40 and conductor 130 to the minus side of supply line 42. Contact 128 co-operates with fixed contacts 131 and 132, contact 131 being connected through conductor 133 to the inner end of magnet coil 134 and contact 132 being connected through conductor 135 to the inner end of magnet coil 136. Magnets 134 and 136 are aligned and are mounted on a member 137 integral with ring 33. The outer ends of the magnet coils 134 and 136 are joined and are connected through conductor 138 to conductor 38 which as previously pointed out, leads to the plus side of line 42. A magnetizable member 139, normally aligned with the axis of trunnions 31 and 32, is fixed to the casing of gyroscope A.

The initial rotation of shaft 113 in one direction causes cam 119 to increase the radius offered to the contact of roller 125 and thus oscillate lever 124 about its pivot to carry contact element 128 out of the position shown in the drawings, the neutral position, and into contact with contact 131 to energize magnet 134. Initial rotation of shaft 113 in the other direction causes cam 119 to diminish the radius offered to the contact of roller 125 and thus allow the spring 126 to oscillate lever 124 into contact with contact 132 to energize magnet 136. As one or the other of magnets 132 and 136 is energized, depending on the direction of rotation of shaft 113, it will tend to attract member 139 to it. The torque thus applied about the axis 34—34a is effective to precess the gyroscope A about the axis of trunnions 31 and 32 to return it to the level position as determined by the gyroscope L'.

In the manner previously described, the follow-up mechanism which is controlled by roller 79 and commutator 82 will cause gimbal member 30 to move with the gyroscope thereby rotating side 108'' and center 108''' of differential 108 to rotate shaft 113 in the opposite direction a sufficient amount to carry cam 119 and lever 124 back to the neutral position when the magnet will be deenergized and no further force will be applied to the gyroscope by the member 139 until one or the other of the contacts 131 or 132 is energized again.

Assuming that the angular movement of the ship is such that there is a cross-level but no level movement. Gyroscope L', to maintain its normal position, will now move relative to the ship about the axis of trunnions 24 and 25, carrying roller 140 with it. Roller 140 is connected through conductors 141 and 37 to conductor 38 which, as previously pointed out, leads to the plus side of supply line 42. Roller 140 is supported on a rod 142 extending from the casing of gyroscope L'. Insulation is provided in rod 142 to electrically separate the roller 140 from gyroscope L'. Roller 140 normally contacts with the central insulation portion of commutator 143 which is carried by a rod 144 depending from the gimbal member 145. Gimbal member 145 is supported on trunnions 146 and 147, normally aligned with trunnions 24 and 25, which extend from gimbal ring 20. Gimbal member 145 is provided with a ring 148 through which passes rod 149 which extends from gyroscope L'. Ring 148 and rod 149 serve as a gyroscope limit stop. Commutator 143 includes contact elements 150 and 151, contact 150 being connected through conductor 152, one of the slip rings 39 and its one of the co-operating brushes 40, and conductor 153 to one of the terminals of the reversible motor 154, and contact 151 being connected through conductor 155, one of the slip rings 39 and its one of the co-operating brushes 40, and conductor 156 to another terminal of motor 154. A conductor 157 connects the common terminal of motor 154 to the minus side of the supply line.

The initial cross-lever movement will thus cause roller 140 to move off the central insulation position of commutator 143 onto one or the other of contacts 150 and 151 to close the circuit of motor 154 so that motor 154 will drive through shaft 158, bevel gears 159, shaft 160, bevel gears 161, hollow shaft 162, bevel gears 163, shaft 164, gear 165 and gear sector 166 attached to rod 167 depending from bail 168, to rotate bail 168 about the axis of trunnions 169 and 170 upon which it is suspended. Trunnions 169 and 170 are carried upon the standards 15 and 16, respectively, at an equal height from turntable 1 as trunnions 18 and 19. Bail 168 is provided with a central slot 171 against the sides of which contacts a rod 172 depending from gimbal member 145.

The movement of bail 168 is transmitted through slot 171 and rod 172 to gimbal member 145 and commutator 143 is made to follow roller 140 to again open the circuit of motor 154 when the central insulation portion is again offered to the contact of roller 140. Since the action of motor 154 is very rapid each increment of movement of gyroscope L' due to cross-level movement is substantially instantaneously followed in a smooth and continuous manner. Motor 154 through shaft 158, bevel gears 159 and shaft 160, also drives bevel gears 173, shaft 174, gears 175 and 176 and side 177' of differential 177. The center 177''', since it is connected through shaft 178 to elements which do not move at this time, can be considered as fixed and side 177' will therefore drive side 177'', gears 179 and 180, shaft 181 and dial 182 fastened thereto to indicate opposite fixed index 183 the instantaneous value of the cross-level angle Z.

Assuming now that there is no movement of the ship, so that both level and cross-level are zero, and that turntable 1 is being trained about its center by the rotation of hand crank 11 when in position to cause engagement of gears 10 and 12. Shafts 57, 96 and 162 and the ones of pairs of bevel gears 58, 97 and 163 attached to them respectively, will not move with turntable 1 since they are mounted in a frame, not shown, which is fixed relative to the ship. Shafts 59, 98 and 164 fixed to them respectively, being carried by turntable 1, move with it. This results in the ones of the pairs of bevel gears 58, 97 and 163 respectively fixed to shafts 59, 98 and 164 walking about the other gears of the pairs with the consequent rotation of shafts 59, 98 and 164. In the manner previously pointed out the rotation of shafts 59, 98 and 164 will cause the movement of the commutators of the follow-up systems of which they form a part, effective to carry those commutators away from their normal position relative to their respective rollers and close the circuit of their respective motors 49, 88 and 154. The rotation of these motors will be in the proper direction to carry the commutators back to their normal position. Due to the previously mentioned rapid action of these motors, the rollers will never be more than just off the neutral position and the pairs of bevel gears 58, 97 and 163 secured to shafts 57, 96 and 162, respectively, will be driven at a rate equal to the rate of rotation of turntable 1. This added rotation of motors 49, 88 and 154 is exactly proportional at any instant to the train angle, hence when turntable 1 is trained, shaft 68 will represent the level angle plus the train angle and shaft 160 the cross-level angle plus the train angle.

Shaft 6 through bevel gears 5 rotates with shaft 4 whenever it rotates to train turntable 1 and is effective through bevel gears 184, shaft 185, worm 186, worm gear 187, shaft 188, spur gear 189, gear 190 and shaft 191 to rotate the center 73''' of differential 73 and thereby to subtract the value of the train angle from the input of side 73' so that the rotation of side 73'' and consequently dial 77 is due solely to the level movement of the ship. Shaft 6, through bevel gears 192, shaft 193, worm 194, worm gear 195, shaft 196, spur gear 197, gear 198 and shaft 178, is effective to rotate center 177''' of differential 177 and thereby subtract the value of the train angle from the input side 177' so that the rotation of side 177'', and consequently dial 182 is due solely to the cross-level movement of the ship.

Consider now the arrangements used to precess gyroscope A and the manner in which it controls the training of turntable 1. A spring 199 has one end fixed to a rod 200 extending from gimbal ring 33 and the other end fixed to an adjusting screw 201 threaded in a bracket 202 depending from gimbal member 30. The pull exerted by spring 199 tends to precess the gyroscope A about the axis of trunnions 34 and 34a. Opposing the pull of spring 199 is a pin 203 which contacts with an ear 204 on gimbal ring 33. Pin 203 contacts at the other end with a bent lever 205 pivoted in a bracket 206 which extends from gimbal member 30. The other end of lever 205 contacts with a pin 207 which passes through the central bore of trunnion 31 and bears against one end of bent lever 208. Lever 208 is pivoted in fork 209 depending from standard 13 and has bearing against its other end a pin 210 which passes through a bore in a frame member 211. Frame member 211 includes a cylindrical portion which passes through the hole 17, thus forming an upper guide bearing for the main frame, and a fork in which is pivoted a lever 212 against one end of which bears the other end of pin 210 and against the other end of which bears a rod 213. The other end of rod 213 bears against the lever 214. Lever 214 is pivoted at one end to a base member 215 and has disposed intermediate its ends a bar 216. A ring 217 extends from the lower end of bar 216 and encircles one arm of an electro-magnet 218, the coil 219 of which is connected to supply line 42 by conductors 220. Ring 217 has a coil 221 wound thereon which is connected by conductors 222 to the brushes 223 of a generator 224 whose field coil 225 is connected by conductors 226 to the supply line 42. The purpose of electro-magnet 219, coil 221 and generator 224 will be gone into hereinafter.

Bar 216 has contacting on one side thereof a pair of rollers 227 mounted on a member 228 which is pivoted to one end of a crank 229. Crank 229 is pivotally mounted on a carriage 230 which is provided with dove-tail tongues that fit in like shaped grooves in base 215. The other end of crank 229 is provided with a hole through which passes one end of a spring 231, the other end of which passes through a hole in nut 232. Nut 232 is carried by an adjusting screw 233 and is provided with an extension which fits into a guideway 234 and serves to hold nut 232 from rotation as screw 233 is rotated. Screw 233 passes through a hole in lug 235 and is rotated by a knurled thumb screw 236 fixed to its upper end. Carriage 230 is provided with a second lug 237 having a threaded hole for the accommodation of elongated screw 238 which is supported in lugs 239 and 240 on base 215.

Screw 238 is driven through gears 241 and 242, shaft 243, bevel gears 244, shaft 245, bevel gears 246, shaft 247, bevel gears 248, shaft 249, pinion 250 and rack 251 from the output slide 252 of multiplying unit 253. A pin 254 passes through slot 255 in slide 252 and extends through slot 256 in input arm 257 which has one end connected to the frame of the mechanism by a pin 257A and the other end pivoted to a rack 258. Rack 258 is driven through pinion 259, shaft 260, bevel gears 261, shaft 262, bevel gears 263, shaft 264, bevel gears 265 and shaft 266 from hand crank 267. Hand crank 267 is rotated in accordance with the rate of change of bearing in the horizontal plane between the ship and the target, this quantity being designated $dB$. A dial 268 driven from shaft 266 by bevel gears 269 and shaft 270 indicates opposite fixed index 271 the value of $dB$ cranked into the mechanism.

Pin 254 of the multiplying unit also extends through a slot 272 in input slide 273. Slide 273 has a pin 274 fixed thereto which engages the cam groove of cam 275. Cam 275 has a toothed periphery and is rotated through spur gear 276, shaft 277, bevel gears 278, shaft 279, bevel gears 280, shaft 281 and bevel gears 282 from shaft 181 in accordance with the value of the cross-level or Z angle. The groove of cam 275 represents a cosine curve so that slide 273 is moved as indicated by the arrows thereon in accordance with the value of the cosine of the cross-level angle. Multiplier 253 is therefore effective to modify $dB$ in accordance with the cosine of the cross-level and to drive screw 238 in accordance with the value of $dB \cos Z$, i. e., the rate of change of bearing in the plane of the deck. The value of the rate is indicated opposite fixed index 283 on dial 284 which is driven from shaft 243 through spur gear 242, gear 285 and shaft 286.

The angle gyroscope precessing mechanism just described is so adjusted by adjusting screws 201 and 233 that when hand crank 267 is rotated until dials 268 and 284 indicate zero bearing rate opposite their respective indexes, the tension of springs 199 and 231 is such that the pull exerted by spring 199 is exactly counterbalanced by the push of rod 203, due to spring 231 acting through the linkage as described. When this condition exists gyroscope A is not subjected to a precessional force. The rotation of hand crank 267 to set up a plus or minus rate will raise or lower carriage 230 from the zero position and change the point of contact of rollers 227 on bar 216, the result being to shorten or lengthen the effective lever arm of lever 216 and consequently diminish or increase the force exerted by pin 203 on ear 204. In either case the final result will be the application of a torque to the gyroscope proportional to the bearing rate which will cause the precession of gyroscope A about the axis of trunnions 34 and 34a.

It is apparent that in order for a torque proportional to the bearing rate to produce a precession of the gyroscope proportional thereto the speed of rotation of the gyroscope A must be controlled. For this purpose the customary method of driving the gyroscope from a three-phase alternating current supply may be employed. If the frequency of this supply is controlled the speed of the gyroscope will also be controlled. This control may be accomplished by the use of a generator driven by a motor the speed of which is controlled by a method such as that disclosed in Patent No. 1,685,440, granted to Harry L. Tanner, September 25, 1928.

As the gyroscope A precesses it carries roller 287 off the central insulation portion of commutator 288 onto one or the other of contacts 289 and 290 thereof since roller 287 being mounted on rod 291, moves with gyroscope A and commutator 288 being mounted on rod 292 integral with gimbal ring 33, does not move with the gyroscope A. Roller 287 is electrically separated from gyroscope A by the provision of insulation in rod 291 and is connected through conductor 293 to conductor 38 which as previously pointed out, leads to the plus side of supply line 42. Contact elements 289 and 290 are connected through conductors 294 and 295 respectively, to the second pair of slip rings 39 and their co-operating ones of brushes 40, and conductors 296 and 297 to the control terminals of reversible motor 298 whose common terminal is connected through conductor 299, switch 300 and conductor 301 to the minus side of supply line 42.

Thus, the precession of gyroscope A is effective to close the circuit of motor 298 which when thus energized drives through shaft 302, bevel gears 303, shaft 304, and bevel gears 305 and the side 306' of differential 306. Considering side 306'' of differential 306 as fixed for the present, side 306' will drive center 306''', shaft 4 and worm 3 to rotate turntable 1 about its center and consequently cause commutator 288 to follow the movement of roller 287. The action of motor 298 is sufficiently rapid to cause commutator 288 to substantially instantaneously follow each increment of movement of roller 287 so that roller 287 is never more than just off the central insulation portion of commutator 288 and the training movement of turntable 1 though made up of a series of small movements, is in effect smooth and continuous.

When the angular movement of the ship is such that the cross-level value Z remains zero, multiplier 253 does not modify the $dB$ input. Under these conditions the axis of trunnions 34 and 34a is maintained vertical. The precessional movement of the spinning axis of gyroscope A takes place in the horizontal plane and is proportional to $dB$.

When the angular movement of the ship is such as to produce cross-level values other than zero, assuming for the sake of simplicity the level value is zero, multiplier 253 converts $dB$ into $dB \cos Z$ and gyroscope A moves about the axis of trunnions 34 and 34a in proportion to this latter rate. Due to the fact that the angular movement of the ship tilts the axis out of the vertical plane through an angle Z the precessional movement of the spinning of the spinning axis of gyroscope A is not in the horizontal plane but is in a plane inclined thereto through angle Z, i. e., in a plane parallel to the deck. As the gyroscope A precesses in such an inclined plane it will by virtue of roller 287, commutator 288, conductors 294 or 295 and 296 or 297, motor 298 and the mechanical connections to the turntable, as previously described in detail, correspondingly turn the turntable and the gyroscope L'. Since the gyroscope A is precessing about an inclined axis, its spinning axis will tend to depart from its normal relation to the horizontal line of sight to the target. The plane of rotation of the gyroscope L' will however remain fixed so that as it is oriented in accordance with the precession of the gyroscope A, there will be a relative movement between it and the turntable. The relative movement will, through roller 36, commutator 43, conductors 47 or 50 and 48 or 51, motor 49 and the mechanical connections to the side 108' of differential 108, as previously described, correspondingly turn this side. The side 108'' will remain fixed since under the assumed conditions of no level movement, there is no actuation of motor 88 and the mechanical connections to this side. The shaft 113 will, therefore, be rotated by the center 108''' of the differential to establish a circuit through one or the other of the magnets 134 and 136, in the manner previously described, to apply a torque to the gyroscope A to cause it to precess about the axis of trunnions 31—32 to restore it to its normal relation to the horizontal line of sight. Thus, during cross-level movements of the ship the precessional movement of the spinning axis of gyroscope A though made up of a series of small alternate off-level and on-level movements in planes angularly disposed to the horizontal plane, are in effect continuous movements in the horizontal plane.

Figs. 4, 5, 6 and 7 show how the precessional forces are combined to cause the desired precession in the horizontal or reference plane.

Figs. 4 and 5 are plan and elevational views respectively, of a condition when the cross-level value is zero. The angle $d$B represents the rate of change of bearing desired in the horizontal plane and is set on the mechanism by hand crank 267 and indicated by dial 268. Since the cross-level value Z is zero the output of multiplying unit 253 will be $d$B cos 0 which equals $d$B×1 or $d$B. Therefore dial 284 will indicate the same as dial 268 and the precessional force applied to the gyroscope A will be proportional to $d$B. Since the deck is horizontal the precession of the gyroscope in the plane of the deck will also be in the horizontal plane and at the rate $d$B as desired.

Figs. 6 and 7 illustrate the operation of the mechanism when the cross-level value is other than zero. Under this condition the desired horizontal rate is introduced by the crank 267 and indicated on dial 268 the same as in the condition illustrated in Figs. 4 and 5. The output of the multiplying unit 253 is $d$B cos Z and since Z is no longer zero $d$B coz Z is less than $d$B and is so indicated by dial 284 and applied to the gyroscope as a precessional force in the plane of the deck. Figs. 6 and 7 show the angle representing the rate $d$B the same as in Figs. 4 and 5, but the angle $d$B cos Z is in the plane of the deck which is displaced from the horizontal by the angle Z. The precessional force $d$B cos Z parallel to the deck will cause the gyroscope A to have a component of movement away from the horizontal as shown in Fig. 7. This movement as previously described is neutralized by a precessional force Y applied by the magnets 134 and 136 under the control of the gyroscope L'. Since this force is so applied as to cause the gyroscope to precess in a direction perpendicular to the deck it will move in the direction as shown in Fig. 7. The combined effect of the precessional force $d$B cos Z in the plane of the deck and the corrective precession perpendicular to the deck, will be a movement of the gyroscope equal to $d$B in the horizontal plane.

In the above description $d$B and Y are considered as infinitely small increments and therefore the plane trigonometrical equation $d$B cos Z may be used for the precessional force in the plane of the deck. The corresponding spherical trigonometrical equation is tan $d$B cos Z and since the tangents of small angles are substantially proportional to the angles, it will be seen that no appreciable error exists because of the use of the equation $d$B cos Z.

The mechanism just described is extremely accurate and compensates for all movements of the ship or platform in determining the generated relative target bearing. In addition to accurately determining the changing values of relative target bearing of a target from a fixed line in the deck or reference plane of the ship as the values of level and cross-level change the gyroscope A with its follow up control roller 287, commutator 288 and motor 298 will be responsive to changes in heading of the ship so that the relative target bearing of a target will be continuously and accurately measured.

It is desirable, in connection with a unit of a system for the control of fire of ordnance, to provide an auxiliary or secondary means of operation, in accordance therewith the following supplemental mechanism is provided.

The supplemental mechanism just mentioned includes an integrator 307 of construction similar to that shown in Patent No. 1,317,915, granted to Hannibal C. Ford on October 7, 1919, for Mechanical movement. The disc 308 of the integrator 307 is driven from a constant speed motor, not shown, but which may be of the form having a regulator as disclosed in Patent No. 1,685,440, granted to Harry L. Tanner, September 25, 1928. The balls 309 are moved relative to the disc 308 in accordance with $d$B by a rack 310 which meshes with a pinion 311 fixed to shaft 266. The output roller 312 rotates in accordance with the changes of true bearing B, i. e., true bearing relative to a fixed azimuth of a line from own ship to target, and through gears 313, drives side 314' of differential 314. Considering side 314'' as fixed at this time the rotation of side 314' will be communicated to center 314''', and through shaft 315, bevel gears 316 shaft 317 and gears 318 to side 319' of differential 319. Considering side 319'' as fixed at this time, the rotation of side 319' will be communicated to center 319''' and through shaft 320 and bevel gears 321 to side 306'' of differential 306. Since side 306' of differential 306 can now be considered as fixed, side 306'' will rotate center 306''' and through shaft 4, worm 3 and worm wheel teeth 2 rotate turntable 1 about its center.

Integrator 307 is thus effective to rotate turntable 1 in accordance with the rate set upon the integrator ball carriage by the hand crank 267, shaft 266, pinion 311 and rack 310. The rate set as just described is the change of true bearing between the own ship and target. Further rotation of turntable 1 must be provided to allow for the relative heading of the own ship relative to the fixed reference line, north for instance, from which the true bearing is generated. The amount of this rotation may be determined from a compass and introduced by means of a hand crank 322 (Fig. 2) which through shaft 323, gears 324 (Figs. 2 and 3) and 325 (Fig. 3) will rotate side 314'' of differential 314. Considering side 314' as fixed at this time, the rotation of side 314'' will be communicated to center 314''' and shaft 315, bevel gears 316, shaft 317, gears 318, differential 319, shaft 320, gears 321, differential 306, shaft 4, worm 3 and worm gear 2 to rotate turntable 1. The value introduced by hand crank 322 is indicated by a dial 326 against an index 327. Dial 326 is driven from shaft 323 by gears 328 and shaft 329.

Conductor 299 includes a switch 330 which when opened will render the motor 298 inoperative. Under this condition the gyroscope A will have no control over the rotation of turntable 1. When switch 330 is closed the integrator 307 and compass input as indicated by dial 326 will continue to drive the turntable 1 but if this drive does not correspond to the precession position of gyroscope A, the control roller 287, commutator 288 and motor 298 will operate to cause the drive of turntable 1 to be such that it will agree with the position of gyroscope A.

It will thus be seen that when switch 330 is open the control of turntable 1 will be by the integrator 307 and compass input as indicated by dial 326. When switch 330 is closed the control of turntable 1 will be from the angle gyroscope A. Under either condition shaft 4 will drive through gears 5, shaft 6 and gears 331 the dial 332 cooperating with readjustment index 333 to indicate the position of the turntable or relative target bearing.

While a hand crank 322 is shown for introducing compass, an automatic introduction of compass may be substituted.

The use of an integrator and compass input to generate relative target bearing is fully described in Patent No. 1,827,812 granted to Hannibal C. Ford, October 20, 1931.

From time to time, due to changes in the bearing rate, dial 332 may indicate a generated bearing which is not the same as the observed bearing. To correct the generated bearing hand crank 11, which is normally in the position shown in the drawing, is rotated. This causes the rotation of gear 334, shaft 335, bevel gears 336, shaft 337, bevel gears 338, shaft 339, bevel gears 340, shaft 341, bevel gears 342, shaft 343, bevel gears 344 and side 319'' of differential 319 to algebraically combine with the rotation caused by integrator 307 and hand crank 322 a rotation sufficient to bring dial 332 to the proper reading. The rotation of shaft 337 also causes electromagnetic clutch 345 to rotate. The coil of clutch 345 is connected to the plus side of line 42 through conductor 346 and to the minus side through conductor 347, switch 300, which at this time is closed, and conductor 301. Since at this time switch 300 is closed clutch 345 is energized and rotates the armature of generator 224 to generate a current which through conductors 222 energizes coil 221. The energization of coil 221 will cause member 217 to be attracted to or repelled from the field of electromagnet 218 to increase or diminish the force exerted by pin 203 on ear 204 and thus temporarily increase or diminish the rate of precession of gyroscope A. Through this arrangement gyroscope A is precessed at approximately the same rate as the turntable is turned by the hand crank 11.

Thus it will be seen, that with the switch 330 either open or closed the hand crank 11 will introduce correction in the generated relative target bearing as indicated by dial 332. With the switch open the automatic control of dial 332 is by integrator 307 and compass input as indicated by dial 326 and with the switch closed the indication of dial 332 will be controlled by the gyroscope A. The indications with the switch 330 closed are as described completely accurate for all movements of the platform or ship including level, cross-level and change of course. With the switch open the indications are approximately accurate but contain inaccuracy due to any level and cross-level values other than zero.

It is to be understood of course that various modifications of the units and connections described herein may be utilized instead of the actual mechanism described herein, but it is intended that such modifications shall come within the scope of the invention as pointed out in the appended claims.

I claim:

1. In a mechanism of the character described adapted to be mounted on an angularly movable platform, the combination of a support rotatable in the plane of said platform, a gyroscope mounted on said support to rotate therewith and movable relative thereto to maintain its axis of rotation in a predetermined direction as said platform moves angularly, a second gyroscope mounted on said support to turn independently thereof, said second gyroscope being mounted to move with said support as the platform moves about one axis and to turn relative to said support as the platform moves about another axis, said gyroscopes being normally positioned in a predetermined relation wherein the first gyroscope and said support are adapted to rotate in the direction in which said second gyroscope turns, means to move said second gyroscope with respect to the support and means controlled by said second gyroscope and by said gyroscopes to respectively rotate said support and move said second gyroscope about said another axis to maintain the normal relation between said gyroscopes.

2. In an instrument for controlling the firing of ordnance on an angularly movable platform, the combination of a gyroscope supported for movement about a pair of mutually perpendicular axes one of which maintains a definite relation to the platform and having its spinning axis stabilized in a normal predetermined relation to a line from the platform to a target, mechanism for applying a torque about said one of the supporting axes in accordance with the rate of change of position of the line to maintain the predetermined relation between it and the spinning axis of the gyroscope, and means for modifying the applied torque to prevent the departure of the spinning axis of the gyroscope from said predetermined relation due to angular movement of the platform.

3. In an instrument for controlling the firing of ordnance on an angularly movable platform, the combination of a gyroscope supported for movement about a pair of mutually perpendicular axes one of which maintains a definite relation to the platform and having its spinning axis stabilized substantially horizontal, mechanism for applying a torque about said one of the supporting axes in accordance with the rate of change of position of a line from the platform to a target to maintain the spinning axis pointing at the target and means for modifying the applied torque to prevent the departure of the spinning axis of the gyroscope from its normal position due to angular movement of the platform.

4. In an instrument for controlling the firing of ordnance on an angularly movable platform, the combination of a gyroscope supported for movement about a pair of mutually perpendicular axes, settable torque applying means effective about one of said axes to precess the gyroscope about the other axis, and compensating means operable to act on the torque applying means and vary its setting to modify the torque applied to said gyroscope in accordance with the component of the angular movement of the platform in a plane containing the axis about which the torque applying means is effective.

5. In an instrument for controlling the firing of ordnance on an angularly movable platform, a gyroscope supported for movement about a pair of mutually perpendicular axes one of which bears fixed relation to the platform, a member settable in accordance with the estimated rate of relative movement of a target, a second member operated in accordance with the function of the angular movement of the platform about an axis substantially horizontal and in the substantially vertical plane of a line to the target, mechanism jointly responsive to the members for applying a torque about said one of the supporting axes to cause the gyroscope to precess about the other axis in accordance with the rate of change of bearing of the target under all conditions of angular movement of the platform.

6. In an instrument for controlling the firing of ordnance on an angularly movable platform, a gyroscope supported for movement about a pair of mutually perpendicular axes one of which bears a fixed relation to the platform; a computor having an input element settable in accordance with the estimated rate of change of bearing of a target, another input element, means for automatically setting said second input element in accordance with the angular movement of the platform about a substantially horizontal axis lying in the substantially vertical plane of a line to the target and an output element operable in accordance with the product of the estimated rate of movement of the target and a function of the said angular movement; and means operable by the output element for applying a torque about said one of the supporting axes to cause the gyroscope to precess about the other axis in accordance with the rate of movement of the target under all conditions of angular movement of the platform.

7. In mechanism of the character described, the combination of a rotatable table, means for rotating the table, a gyroscope movable relatively to the table, means for mounting the gyroscope on the table, a motor fixed against rotation with said table, a driving connection between the motor and the mounting means, means responsive to relative movement between the gyroscope and the mounting means and between the table and the motor for controlling the motor in accordance with the sum or difference of such relative movements and a device having one part actuated in accordance with the actuation of the motor, a second part actuated in accordance with the rotation of the table and a third part actuated by the first and second parts to give the relative movement between the table and the gyroscope.

8. In a mechanism of the character described, the combination of a rotatable support, an element mounted on and for rotation with said support, a gyroscope mounted for spinning in said element, a second gyroscope mounted in said element for independent movement about a plurality of axes and normally bearing a predetermined relation to said element, in which relation the supporting and spinning axes of the first gyroscope are respectively perpendicular and parallel to the axis of rotation of said support, and the supporting axes of the second gyroscope are respectively perpendicular and parallel to said axis of rotation, and the spinning axis of said second gyroscope is perpendicular to said axis of rotation, means to cause said second gyroscope to move about one of its axes, means controlled by said second gyroscope as it moves about said one of its axes to rotate said support, and means controlled jointly by said gyroscopes operable to move said second gyroscope about another of its axes when said second gyroscope departs from the normal predetermined relation between it and said element of the first gyroscope.

9. In an instrument for controlling the firing of ordnance on an angularly movable platform, stabilizing means for establishing a substantially horizontal reference plane, a gyroscope having a cardan mounting about two mutually perpendicular axes, one of which axes is constrained parallel to the platform, and means controlled by the stabilizing means to constrain the other axis in a plane perpendicular to the reference plane.

10. In an instrument for controlling the firing of ordnance on an angularly movable platform, a turntable mounted for training movement on the platform, a level gyroscope mounted on the turntable with freedom of movement about two mutually perpendicular axes and operative to establish a horizontal reference plane, means controlled by the level gyroscope for measuring the angular movement of the platform in cross level in an angle gyroscope mounted on the platform with freedom of movement about two mutually perpendicular axes, one of which axes is fixed perpendicular to the training axis and the other of which is normally parallel to said training axis, means to impose a precessional force on the angle gyroscope about said one axis to cause it to precess about the other axis, means responsive to said precession to train the turntable, and means responsive to the cross level measuring means to modify the precessional force imposed upon the angle gyroscope as the training axis tilts in cross level movement.

11. In an instrument for controlling the firing of ordnance on an angularly movable platform, a turntable mounted for training movement on the platform, a level gyroscope mounted on the turntable with freedom of movement about two mutually perpendicular axes and operative to establish a horizontal reference plane, means controlled by the level gyroscope for measuring the angular movement of the platform in cross level, an angle gyroscope mounted on the platform with freedom of movement about two mutually perpendicular axes, one of which axes is fixed perpendicular to the training axis and the other of which is normally parallel to said training axis, means controlled by the level gyroscope to constrain the other axis of the angle gyroscope in the vertical plane through the said one axis, means to impose a precessional force on the angle gyroscope about said one axis to cause it to precess about the other axis, means responsive to said precession to train the turntable, and means responsive to the cross level measuring means to modify the precessional force imposed upon the angle gyroscope as the training axis tilts in cross level movement.

12. In an instrument for controlling the firing of ordnance on an angularly movable platform, two gyroscopes mounted on the platform for angular movement about parallel axes, a power follow-up controlled by said angular movement of each gyroscope, comparing means operatively connected to the two follow-ups for comparing the values of said angular movements, and means controlled by said comparing means to control the level of one gyroscope to bring it into agreement with the other.

13. In an instrument for controlling the firing of ordnance on an angularly movable platform, a turntable trainable on the platform, a gyroscope support carried by the turntable, two parallel axes fixed in said support, a gyroscope mounted on each of said axes for angular movement thereon, a power follow-up controlled by said angular movement of each gyroscope, comparing means operatively connected to the two follow-ups for comparing the values of said angular movements, and means controlled by said comparing means to control the level of one gyroscope to bring it into agreement with the other.

14. In an instrument for controlling the firing of ordnance on an angularly movable platform, a turntable trainable on the platform, a gyroscope support carried by the turntable, two parallel axes fixed in said support, a gyroscope mounted on each of said axes for angular movement thereon, a power follow-up controlled by said angular movement of each gyroscope, comparing means operatively connected to the two followups for comparing the values of said angular movements, means controlled by said comparing means to control the level of one gyroscope to bring it into agreement with the other, settable means for imposing a precessional force on one of said gyroscopes about said parallel axis, and means controlled by the precession occasioned thereby to train the turntable.

15. In mechanism of the character described, the combination of a gyroscope, a gimbal suspension mounting said gyroscope for axial support and to spin about a vertical axis, a second gyroscope supported for movement relatively to said first gyroscope about a plurality of axes, the gyroscopes being normally positioned in a predetermined relation in which their spininng axes are angularly disposed with respect to each other, means to precess the second gyroscope about one of its axes, means controlled by the second gyroscope as it precesses about said one axis including an orienting drive operable to move the first gyroscope to maintain an axis of said gimbal suspension in a predetermined relation to the spin axis of said second gyroscope and means controlled jointly by the gyroscopes operable to precess the second gyroscope about another of its axes.

16. In an instrument for controlling the firing of ordnance on an angularly movable platform, the combination of a gyroscope supported for movement about a pair of axes one of which bears a fixed relation to the platform, a device for applying a torque about said one of the supporting axes only to precess the gyroscope about the other axis at a predetermined rate, means for determining the angular movement of the platform in the vertical plane thru said one axis, and means controlled by said determining means for actuating said device proportionately to a function of the said angular movement to correspondingly modify the torque applied to the gyroscope by said device.

17. In an instrument for controlling the firing of ordnance on an angularly movable platform adapted to additionally move in azimuth, the combination of a gyroscope supported for movement about a pair of axes one of which bears a predetermined relation to the platform, mechanism including an element operable in accordance with the rate of change of azimuthal movement of the platform, a device operable by the mechanism for applying a torque about said one of the supporting axes to precess the gyroscope about the other supporting axis at a predetermined rate and means for determining a function of the angular movement of the platform in the vertical plane through said one axis, said mechanism having another element operable in accordance with said determining means and coacting with the first named element whereby the operation of the mechanism is modified in accordance with said function to correspondingly modify the torque applied to the gyroscope by the device.

18. In an instrument for controlling the firing of ordnance on an angularly movable platform, the combination of a gyroscope supported for movement about a pair of mutually perpendicular axes one of which is fixed parallel to the platform, a device for applying a torque about said one of the supporting axes to precess the gyroscope about the other axis at a predetermined rate, means for measuring the angular movement of the platform in the vertical plane through said one axis and mechanism controlled by said means and operating on the device for modifying the torque applied to the gyroscope in accordance with a function of the said angular movement of the platform.

19. In an instrument for controlling the firing of ordnance on an angularly movable platform, the combination of a gyroscope, mechanism for applying a torque to precess the gyroscope in accordance with the estimated rate of change of bearing of a target, means for measuring the component of angular movement of the platform about a substantially horizontal axis in the substantially vertical plane of a line from the platform to the target, and a device operated by said means proportional to said component and coacting with the mechanism for modifying said torque to vary the rate at which said mechanism precesses the gyroscope in accordance with a function of the component of the angular movement of the platform about said axis.

20. In an instrument for controlling the firing of ordnance on an angularly movable platform, the combination of a gyroscope, a device settable in accordance with the estimated rate of relative movement of a target in a substantially horizontal stable plane, means operable upon the device for continuously converting the said estimated rate of movement of the target into the equivalent projected component of movement in the plane of the platform throughout its angular movement and mechanism actuated by the means and operable on the gyroscope for precessing it in azimuth in accordance with the converted rate of movement of the target.

21. In an instrument for controlling the firing of ordnance on an angularly movable platform, the combination of a gyroscope supported for movement about a pair of mutually perpendicular axes and having its spinning axis bearing a normal predetermined relation to a line from the platform to a target, a device settable in accordance with the estimated rate of angular movement of the line from the platform to the target in a substantially horizontal stable plane, means operable upon the device for continuously converting the estimated rate of movement of the line into the equivalent projected component of movement in the plane of the platform throughout its angular movement and mechanism actuated by the means and operable on the gyroscope for applying a torque about one of its axes to cause it to precess about its other axis in azimuth in accordance with the converted rate of movement of the line to maintain the predetermined relation between it and the spinning axis under all conditions of angular movement of the platform.

22. In an instrument for controlling the firing of ordnance on an angularly movable platform, the combination of a gyroscope supported for movement about a pair of mutually perpendicular axes one of which maintains a definite relation to the platform and has its spinning axis stabilized substantially horizontally, mechanism for applying a torque about said one of the supporting axes in accordance with the rate of change of position of a line from the platform to a target capable of moving in three dimensional space to maintain the spinning axis pointing at the target, and means for modifying the applied torque to prevent the departure of the spinning axis of the gyroscope from its normal position due to angular movement of the platform.

23. In an instrument for controlling the firing of ordnance on an angularly movable platform, the combination of a gyroscope supported for universal movement, settable means to cause the gyroscope to precess about an axis, means for measuring the angular movement of the platform relative to said axis, and means actuated by said measuring means to modify the action of said settable means in accordance with the component of angular movement of the platform in a plane at right angles to the said axis.

24. Mechanism as described for use on an angularly moving platform, comprising a first gyroscope for measuring the angular movement of the platform, means to indicate departure of said gyroscope from an initial position whereby corrections necessary to return said gyroscope to its initial position are indicated, a second gyroscope settable to a predetermined relation with respect to said first gyroscope, adjustable precessing means effective to maintain the spin axis of the second gyroscope directed toward a target, and means controlled by said first gyroscope to apply correctional factors to the precessing means to maintain said second gyroscope directed toward the target regardless of changes of angularity of the platform.

ELLIOTT P. ROSS.

REFERENCES CITED

The following references are of record in the file of this patent:

UNITED STATES PATENTS

| Number | Name | Date |
|---|---|---|
| 1,031,769 | Barr et al. | July 9, 1912 |
| 1,279,471 | Sperry | Sept. 17, 1918 |
| 1,308,693 | Beattie | July 1, 1919 |
| 1,309,409 | Henderson | July 8, 1919 |
| 1,324,477 | Tanner | Dec. 9, 1919 |
| 1,390,471 | Sundhausen | Sept. 13, 1921 |
| 1,445,805 | Sperry | Feb. 20, 1923 |
| 1,531,132 | Radford | Mar. 24, 1925 |
| 1,542,809 | Alexander et al. | June 23, 1925 |
| 1,685,762 | Sparling | Sept. 25, 1928 |
| 1,686,516 | Crouse | Oct. 9, 1928 |
| 1,687,970 | Corliss | Oct. 16, 1928 |
| 1,733,531 | Dugan | Oct. 29, 1929 |
| 1,749,059 | Bassett | Mar. 4, 1930 |
| 1,840,497 | Ford | Jan. 12, 1932 |
| 1,936,442 | Willard | Nov. 21, 1933 |
| 1,950,517 | Rawlings | Mar. 13, 1934 |

FOREIGN PATENTS

| Number | Country | Date |
|---|---|---|
| 191,410 | Great Britain | Aug. 15, 1918 |
| 361,330 | Germany | Oct. 13, 1922 |
| 700,211 | France | Dec. 22, 1930 |
| 228,818 | Germany | Nov. 22, 1910 |
| 281,307 | Germany | Dec. 21, 1914 |